(12) United States Patent
Ergen et al.

(10) Patent No.: US 11,510,254 B2
(45) Date of Patent: Nov. 22, 2022

(54) METHOD AND SYSTEM FOR AUTOMATICALLY MANAGING A PLURALITY OF WI-FI ACCESS POINTS USING A NETWORK MANAGEMENT CLOUD

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/854,717

(22) Filed: Dec. 26, 2017

(65) Prior Publication Data
US 2022/0191950 A1    Jun. 16, 2022

Related U.S. Application Data

(60) Provisional application No. 62/498,378, filed on Dec. 27, 2016.

(51) Int. Cl.
*H04W 76/10*    (2018.01)
*H04W 24/02*    (2009.01)
(Continued)

(52) U.S. Cl.
CPC .......... *H04W 76/10* (2018.02); *H04L 61/103* (2013.01); *H04L 61/4511* (2022.05); *H04W 12/73* (2021.01); *H04W 24/02* (2013.01); *H04W 48/18* (2013.01); *H04W 84/02* (2013.01); *H04W 88/08* (2013.01)

(58) Field of Classification Search
CPC . H04W 76/10; H04W 12/73; H04W 12/4633; H04W 12/5691; H04W 24/02; H04W 48/18; H04W 84/02; H04W 88/08; H04W 88/18; H04W 16/18;
(Continued)

(56) References Cited

U.S. PATENT DOCUMENTS

2006/0114839 A1 *  6/2006  Meier ............... H04L 41/12
                                              370/254
2010/0095359 A1 *  4/2010  Gordon ............. H04W 12/04
                                              726/6
(Continued)

*Primary Examiner* — Ian N Moore
*Assistant Examiner* — Brian T Le
(74) *Attorney, Agent, or Firm* — Mark Farrell; Farrell Patent Law PC

(57) ABSTRACT

The invention provides a method and system for automatically managing a plurality of Wi-Fi access points using a network management cloud. In order to manage the plurality of Wi-Fi access points, a connection is established between one or more Wi-Fi access points and a client device using the network management cloud. The network management cloud, then, receives and analyzes information from the client device related to controlling one or more Wi-Fi access points. Thereafter, the network management cloud determines one or more operation settings for the one or more Wi-Fi access points based on the analyzed information. The one or more operation settings of the one or more Wi-Fi access points are then configured using the network management cloud. Thus, the one or more Wi-Fi access points are configured by the client device through the network management cloud.

15 Claims, 9 Drawing Sheets

(51) Int. Cl.
*H04W 48/18* (2009.01)
*H04L 61/103* (2022.01)
*H04W 12/73* (2021.01)
*H04L 61/4511* (2022.01)
*H04W 84/02* (2009.01)
*H04W 88/08* (2009.01)

(58) Field of Classification Search
CPC .......... H04W 36/0083; H04L 61/4511; H04L 61/103; H04L 41/0823; H04B 7/15; H04B 1/38
See application file for complete search history.

(56) References Cited

U.S. PATENT DOCUMENTS

| | | | | |
|---|---|---|---|---|
| 2010/0138660 | A1* | 6/2010 | Haynes | H04L 63/061 |
| | | | | 713/171 |
| 2016/0321447 | A1* | 11/2016 | Lancioni | H04W 12/06 |
| 2017/0104625 | A1* | 4/2017 | Chen | H04L 67/10 |
| 2018/0063714 | A1* | 3/2018 | Stephenson | H04L 63/083 |

* cited by examiner

METHOD AND SYSTEM FOR AUTOMATICALLY MANAGING A PLURALITY OF WI-FI ACCESS POINTS USING A NETWORK MANAGEMENT CLOUD

FIELD OF THE INVENTION

The invention generally relates to automatically managing a plurality of Wi-Fi access points using a cloud platform. More specifically, the invention relates to remotely configuring operation settings of one or more Wi-Fi access points from one or more client devices through a network management cloud.

BACKGROUND OF THE INVENTION

Wi-Fi networks are formed using one or more Wi-Fi access points that support a connection of multiple wireless devices to a wired connection for access to the Internet. Due to huge demand, enormous number of Wi-Fi access points are deployed in places such as, but not limited to, residential spaces, apartments, office buildings and public spaces and the Wi-Fi access points are densely concentrated around certain places with high data traffic.

In dense deployments, current Wi-Fi access points operate at low performance due to lack of self-organizing feature. Also, performance of the current Wi-Fi access points decreases due to various factors, such as, but not limited to, limited channel bandwidth, an interference among geographically proximate access points, limited adaptation to changes in network topology and user statistics. Further, managing the enormous number of Wi-Fi access points can be difficult for operators of the Wi-Fi access points without tracking the performance of the Wi-Fi access points.

Therefore, in light of the above, there is a need for a method and system for automatically managing and remotely configuring parameters of the Wi-Fi access points using a single cloud platform in order to enable the Wi-Fi access points to operate at optimal performance.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
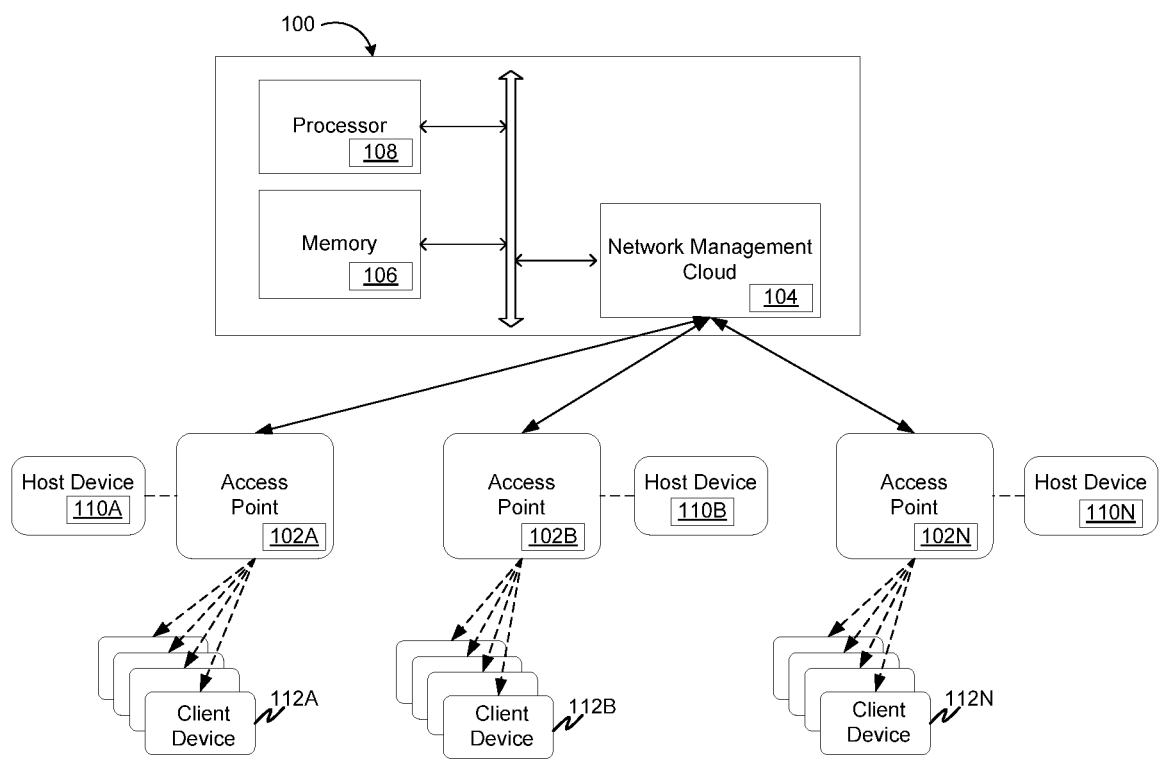
FIG. 1 illustrates a system for automatically managing a plurality of Wi-Fi access points using a network management cloud in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to automatically managing a plurality of Wi-Fi access points using a network management cloud.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for automatically managing a plurality of Wi-Fi access points using a network management cloud. In order to manage the plurality of Wi-Fi access points, a connection is established between one or more Wi-Fi access points and a client device using the network management cloud. The network management cloud acts as an intermediary between the one or more Wi-Fi access points and the client device. Once the connection is established, the network management cloud receives information from the client device related to controlling the one or more Wi-Fi access points. The network management cloud analyzes the received information from the client device and determines one or more operation settings for the one or more Wi-Fi access points based on the analyzed information. The one or more operation settings of the one or more Wi-Fi access points are then configured using the network management cloud. Thus, the one or more Wi-Fi access points are configured by the client device through the network management cloud.

FIG. 1 illustrates a system 100 for automatically managing a plurality of Wi-Fi access points 102A-102N using a network management cloud 104 in accordance with an embodiment of the invention.

As illustrated in FIG. 1, system 100 includes a memory 106 and a processor 108 communicatively coupled to memory 106. Network management cloud 104 is communicatively coupled to memory 106 and processor 108.

Network management cloud 104 communicates with plurality of Wi-Fi access points 102A-102N that are operated by a plurality of host devices 110A-110N and a plurality of client devices 112A-112N. Plurality of Wi-Fi access points 102A-102N are deployed in places such as, but not limited to, homes, enterprises and public spaces. Plurality of client devices 112A-112N are user devices such as, but not limited to, a mobile device, a personal digital assistant, a computer, a laptop, a smart phone and a tablet.

In order to manage a Wi-Fi access point 102A of plurality of Wi-Fi access points 102A-102N from a client device 112A of plurality of client devices 112A-112N, a connection is established between Wi-Fi access point 102A and client device 112A using network management cloud 104. Thus, network management cloud 104 acts as an intermediary between Wi-Fi access point 102A and client device 112A.

After establishing the connection between Wi-Fi access point 102A and client device 112A, network management cloud 104 receives information from client device 112A related to controlling Wi-Fi access point 102A. Network management cloud 104, then, analyzes the received information from client device 112A.

On analyzing the received information from client device 112A, network management cloud 104 determines one or more operation settings for Wi-Fi access point 102A based on the analyzed information. The one or more operation settings can be, but need not be limited to, an operating channel, an operating frequency band, a service set identifier (SSID), a modulation and coding scheme and a transmission power setting.

Thereafter, network management cloud 104 configures the one or more operation settings of Wi-Fi access point 102A. Thus, Wi-Fi access point 102A is configured by client device 112A through network management cloud 104.

Moving on, for establishing the connection between Wi-Fi access point 102A and client device 112A, processor 108 establishes a connection between Wi-Fi access point 102A and network management cloud 104. Thereafter, processor 108 establishes a connection between client device 112A and network management cloud 104. Once the connection is established between client device 112A and network management cloud 104, processor 108 allows client device 112A to access Wi-Fi access point 102A through network management cloud 104.

In order to establish the connection between Wi-Fi access point 102A and network management cloud 104, processor 108 allows network management cloud 104 to receive a set of credentials associated with Wi-Fi access point 102A. The set of credentials are entered by a client to access a web-based interface of client device 112A. Further, the set of credentials include username-password combination. After receiving the set of credentials, processor 108 enables a remote access feature in order to remotely manage Wi-Fi access point 102A through network management cloud 104.

Thereafter, network management cloud 104 changes one or more domain name servers (DNS) pointed to by Wi-Fi access point 102A. Further, network management cloud 104 changes a SSID of the network of Wi-Fi access point 102A. The SSID that has been changed is associated with network management cloud 104. Thus, changing the SSID eliminates a need for a Wi-Fi password as an authentication is performed through network management cloud 104.

Moving on, for establishing the connection between client device 112A and network management cloud 104, processor 108 allows client device 112A to download a network management cloud application from an application store.

Once the network management cloud application is downloaded at client device 112A, processor 108 provides a new instance associated with client device 112A to network management cloud 104. In response to providing the new instance, network management cloud 104 sends a set of credentials associated with Wi-Fi access point 102A to client device 112A.

Thereafter, client device 112A transmits a request for an address resolution protocol (ARP) table to Wi-Fi access point 102A. In response to transmitting the request for the ARP table, client device 112A receives the ARP table from Wi-Fi access point 102A. Based on the received ARP table from Wi-Fi access point 102A, client device 112A determines a media access control (MAC) address.

After determining the MAC address, client device 112A transmits a sign up request to network management cloud 104 using the determined MAC address. The sign up request transmitted to network management cloud 104 includes a local IP address, a public IP address, a gateway IP address and the MAC address. In response to the sign up request received by network management cloud 104, processor 108 enables client device 112A to log in to network management cloud 104.

In accordance with an embodiment, the network management cloud application is downloaded to client device 112A using host device 110A of Wi-Fi access point 102A.

In order to download the network management cloud application, client device 112A transmits a connection request to host device 110A. In response to receiving the connection request, host device 110A transmits a request for an ARP table to network management cloud 104. On receiving the request for the ARP table, network management cloud 104 transmits the request to Wi-Fi access point 102A.

Further, in response to receiving the ARP table request from network management cloud 104, Wi-Fi access point 102A transmits the ARP table to network management cloud 104 that further transmits the ARP table to host device 110A. After receiving the ARP table, host device 110A requests network management cloud 104 to provide internet access to client device 112A for downloading the network management cloud application. Network management cloud 104, then, checks the ARP table to determine whether client device 112A needs to be moved to a blacklist. On determining that client device 112A does not have to be moved to the blacklist, network management cloud 104 provides internet access to client device 112A for downloading the network management cloud application.

Further, in accordance with an embodiment, when client device 112A tries to connect to the SSID of network management cloud 104 without downloading the network management cloud application, client device 112A gains internet access as the SSID is associated with an Open Wi-Fi network. Network management cloud 104, then, periodically checks the ARP table associated with Wi-Fi access point 102A. On noticing that client device 112A is present in the ARP table of Wi-Fi access point 102A, network management cloud 104 adds client device 112A to a MAC Filtering Blacklist. Once added to the blacklist, client device 112A does not get disconnected from the network but loses the internet access. Client device 112A, then, disconnects from the network or continues to access its device data for accessing the internet. However, when client device 112A visits Wi-Fi access point 102A next time, network management cloud 104 releases client device 112A from the blacklist.

Once the connection is established between Wi-Fi access point 102A and network management cloud 104 and between client device 112A and network management cloud 104, client device 112A is allowed to access Wi-Fi access point 102A through network management cloud 104.

In order to access Wi-Fi access point 102A, client device 112A transmits an access request to network management cloud 104. Thereafter, network management cloud 104 transmits a first push notification to host device 110A of Wi-Fi access point 102A. The first push notification indicates the access request received from client device 112A.

In response to the first push notification, network management cloud 104 receives an approval for access from host device 110A. Network management cloud 104, then, transmits a second push notification to client device 112A by indicating the approval for access from host device 110A.

In accordance with an embodiment, client device 112A may use push notifications, public passwords, auto-generated public passwords and quick response (QR) codes to send the access request to network management cloud 104 for accessing one more Wi-Fi access points 102A-102N. The public passwords are software based passwords that are associated with network management cloud 104 and hence host device 110A is allowed to change the public passwords at any time. Further, the auto-generated public passwords include a logical schema that generates the public passwords every day automatically.

Moving on, processor 108 further allows network management cloud 104 to perform periodic collection of user statistics and historical user data from client device 112A. Based on the user statistics and the historical user data collected from client device 112A, network management cloud 104 dynamically optimizes one or more network parameters associated with Wi-Fi access point 102A. The one or more network parameters can be, but need not be limited to, an interference among geographically proximate Wi-Fi access points and a network topology.

Additionally, the optimization based on the historical user data achieves optimal performance at high density corresponding to Wi-Fi access point 102A through forecasting and exploiting potential beneficial actions. For instance, if no user is connected to Wi-Fi access point 102A at certain times during the day, Wi-Fi access point 102A need not to be included in the optimization.

Further, processor 108 allows network management cloud 104 to handle dynamic IP address changes of a router associated with Wi-Fi access point 102A. In order to handle dynamic IP address changes, network management cloud 104 configures Wi-Fi access point 102A to point to a DNS associated with network management cloud 104.

Thereafter, network management cloud 104 enables client device 112A to perform a DNS lookup through a DNS proxy associated with network management cloud 104. Thus, network management cloud 104 does not lose a connection with Wi-Fi access point 102A and a manipulative access to Wi-Fi access point 102A is provided in case of the dynamic IP address changes of the router.

Figure 2:
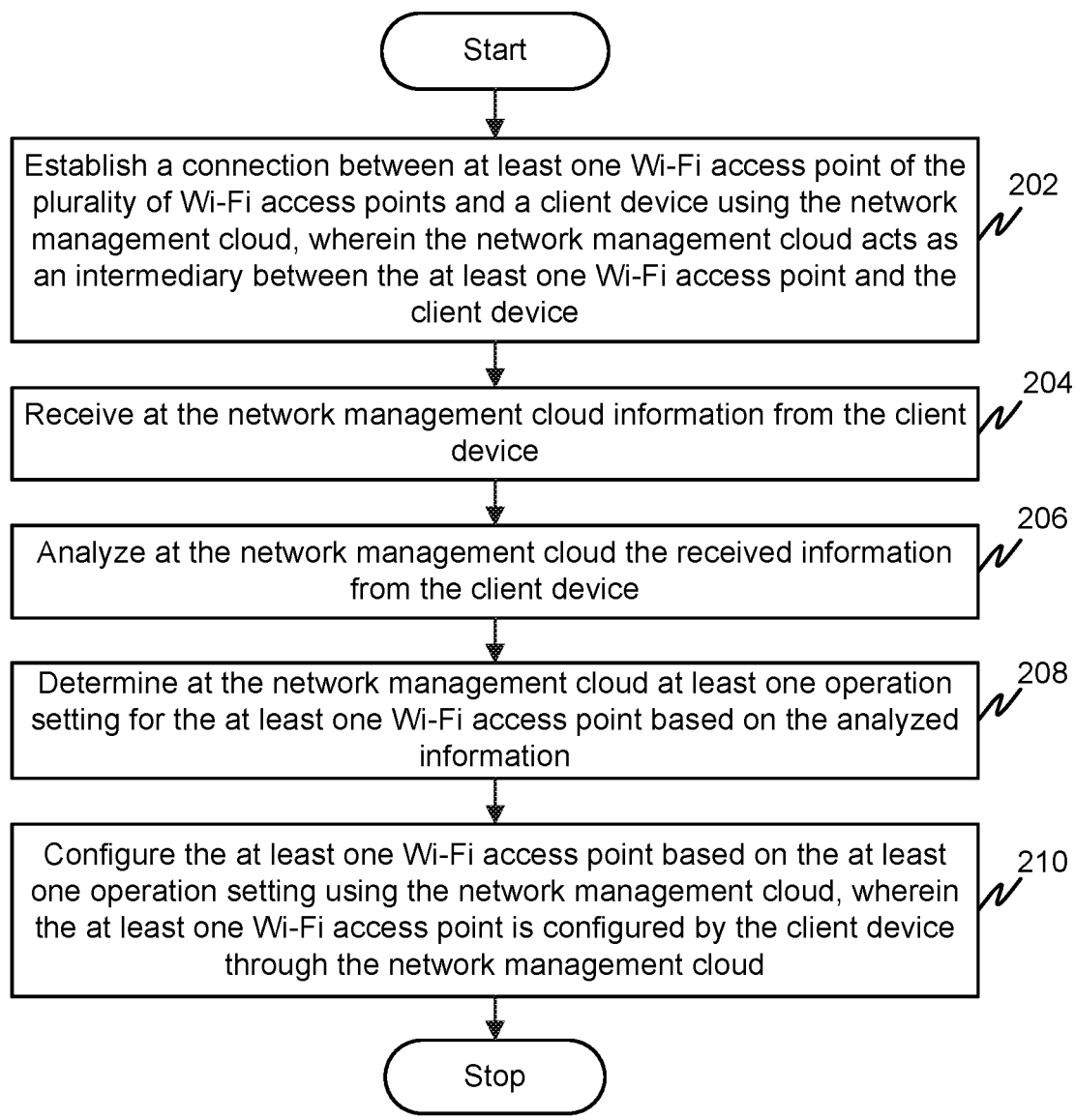
FIG. 2 illustrates a flowchart of a method for automatically managing a plurality of Wi-Fi access points using a network management cloud in accordance with an embodiment of the invention.

FIG. 2 illustrates a flowchart of a method for automatically managing plurality of Wi-Fi access points 102A-102N using network management cloud 104 in accordance with an embodiment of the invention.

At step 202, a connection is established between Wi-Fi access point 102A of plurality of Wi-Fi access points 102A-102N and client device 112A using network management cloud 104. Network management cloud 104 acts as an intermediary between Wi-Fi access point 102A and client device 112A. Establishing connection between Wi-Fi access point 102A and client device 112A is further described in detail in conjunction with FIG. 3.

At step 204, information is received from client device 112A by network management cloud 104. Thereafter, at step 206, the received information from client device 112A is analyzed by network management cloud 104.

Once the information from client device 112A is analyzed, at step 208, one or more operation settings for Wi-Fi access point 102A is determined by network management cloud 104 based on the analyzed information.

Thereafter, at step 210, the one or more operation settings of Wi-Fi access point 102A are configured using network management cloud 104. Thus, Wi-Fi access point 102A is configured by client device 112A through network management cloud 104.

Figure 3:
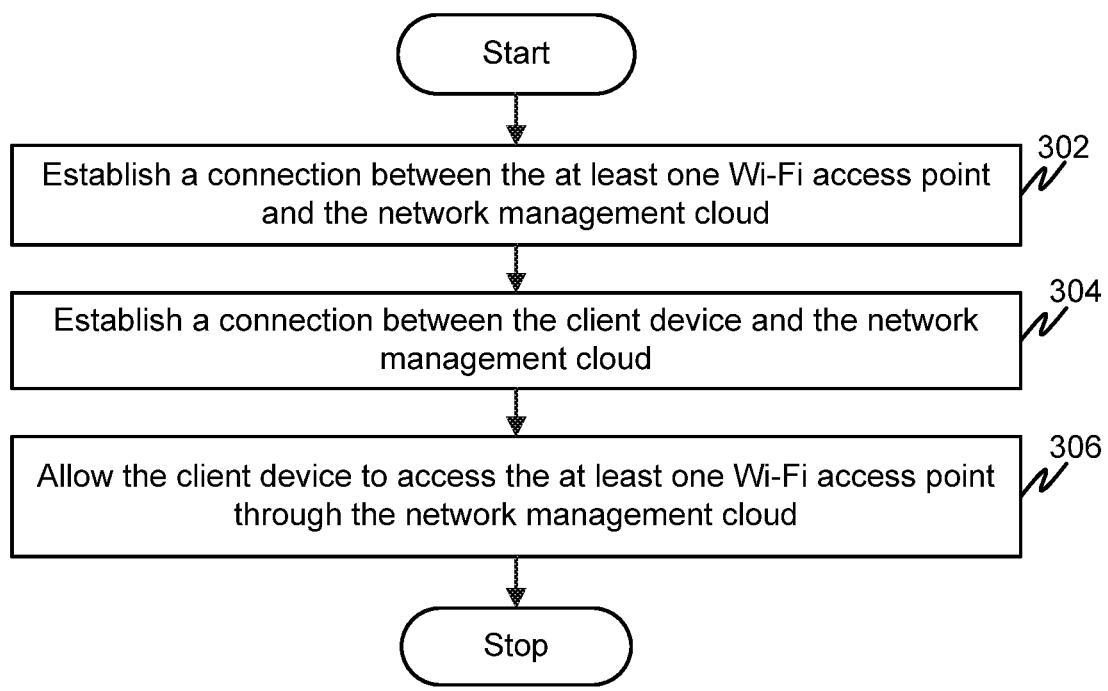
FIG. 3 illustrates a flowchart of a method for establishing a connection between a Wi-Fi access point and a client device using a network management cloud in accordance with an embodiment of the invention.

FIG. 3 illustrates a flowchart of a method for establishing a connection between Wi-Fi access point 102A and client device 112A using network management cloud 104 in accordance with an embodiment of the invention.

At step 302, a connection is established between Wi-Fi access point 102A and network management cloud 104. Step 302 is further described in detail in conjunction with FIG. 4.

At step 304, a connection is then established between client device 112A and network management cloud 104. Step 304 is further described in detail in conjunction with FIG. 5.

Thereafter at step 306, client device 112A is allowed to access Wi-Fi access point 102A through network management cloud 104. Step 306 is further described in detail in conjunction with FIG. 7.

Figure 4:
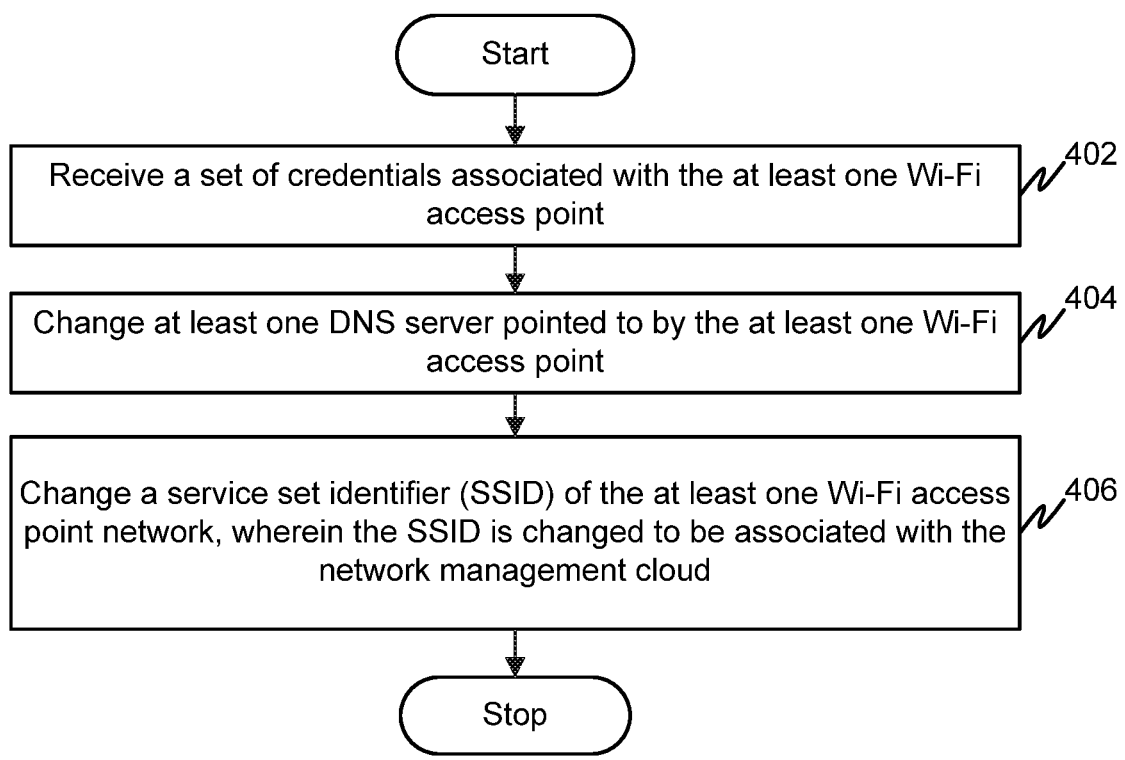
FIG. 4 illustrates a flowchart of a method for establishing a connection between a Wi-Fi access point and the network management cloud in accordance with an embodiment of the invention.

FIG. 4 illustrates a flowchart of a method for establishing a connection between Wi-Fi access point 102A and network management cloud 104 in accordance with an embodiment of the invention.

At step 402, a set of credentials associated with Wi-Fi access point 102A are received by network management cloud 104. Thereafter, at step 404, one or more DNS servers pointed to Wi-Fi access point 102A are changed by network management cloud 104.

Further, at step 406, a SSID of the network of Wi-Fi access point 102A is changed at network management cloud 104. The SSID is changed to be associated with network management cloud 104.

Figure 5:
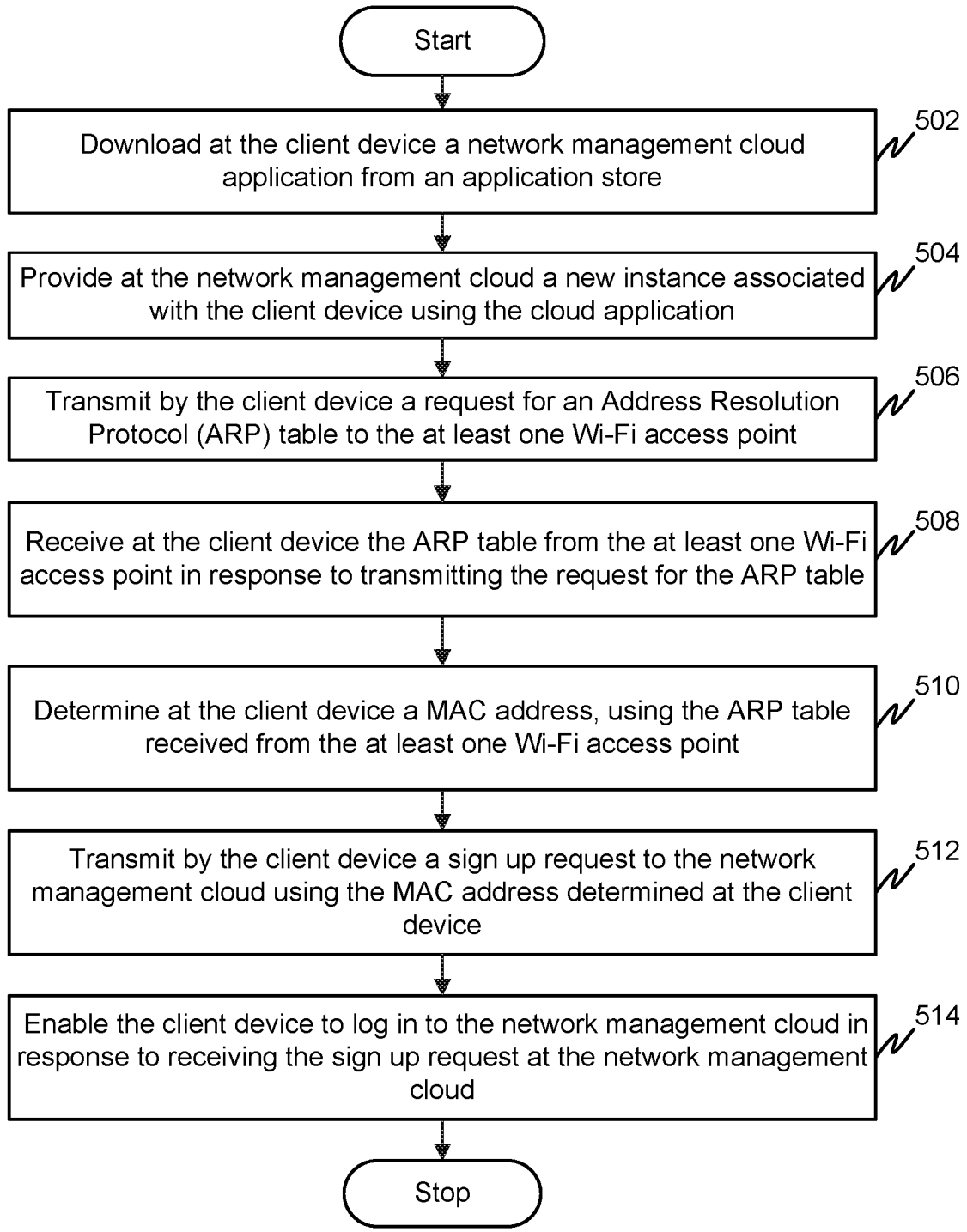
FIG. 5 illustrates a flowchart of a method for establishing a connection between a client device and the network management cloud in accordance with an embodiment of the invention.

FIG. 5 illustrates a flowchart of a method for establishing a connection between client device 112A and network management cloud 104 in accordance with an embodiment of the invention.

At step 502, a network management cloud application is downloaded at client device 112A form an application store. Step 502 is further described in detail in conjunction with FIG. 6.

After downloading the network management cloud application, at step 504, a new instance associated with client device 112A is provided to network management cloud 104 using the network management cloud application. At step 506, a request for an address resolution protocol (ARP) table is then, transmitted by client device 112A to Wi-Fi access point 102A.

In response to transmitting the request for the ARP table, at step 508, the ARP table is received at client device 112A from Wi-Fi access point 102A. Thereafter, at step 510, a media access control (MAC) address is determined at client device 112A using the ARP table received from Wi-Fi access point 102A.

Once the MAC address is determined, at step 512, a sign up request is transmitted by client device 112A to network management cloud 104 using the MAC address determined at client device 112A. In response to receiving the signup request by network management cloud 104, at step 514, client device 112A is enabled to log into network management cloud 104.

Figure 6:
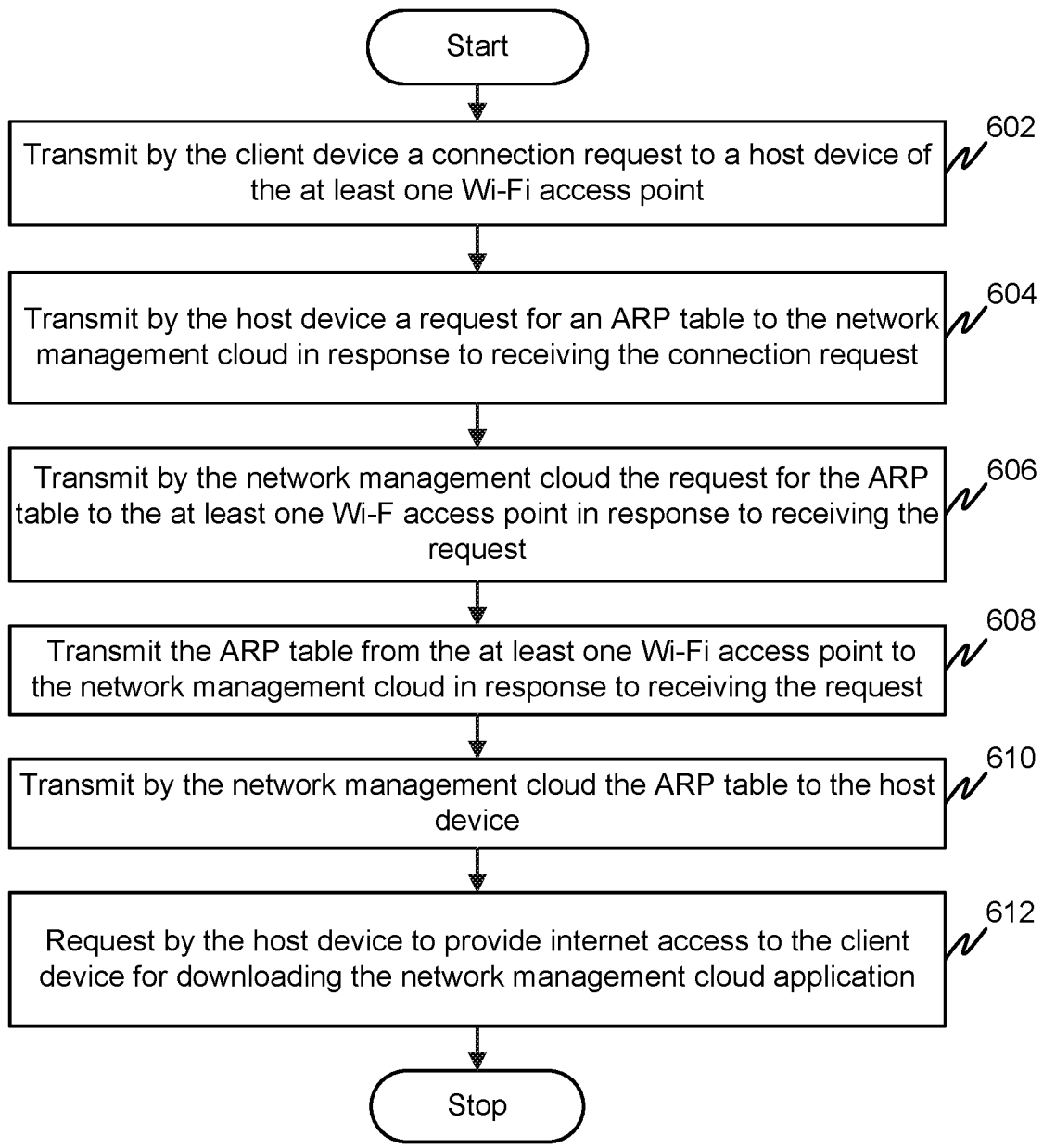
FIG. 6 illustrates a flowchart of a method for downloading a network management cloud application at a client device in accordance with an embodiment of the invention.

FIG. 6 illustrates a flowchart of a method for downloading a network management cloud application at client device 112A in accordance with an embodiment of the invention.

At step 602, a connection request is transmitted by client device 112A to host device 110A of Wi-Fi access point 102A.

In response to receiving the connection request, at step 604, a request for an ARP table is transmitted by host device 110A to network management cloud 104. In response to receiving the request for the ARP table, at step 606, the request for the ARP table is transmitted by network management cloud 104 to Wi-Fi access point 102A.

In response to receiving the request for the ARP table by Wi-Fi access point 102A, at step 608, the ARP table from Wi-Fi access point 102A is transmitted to network management cloud 104. Thereafter, at step 610, the ARP table is transmitted by network management cloud 104 to host device 110A.

In response to receiving the ARP table, at step 612, host device 110A requests network management cloud 104 to provide internet access to client device 112A for downloading the network management cloud application.

Figure 7:
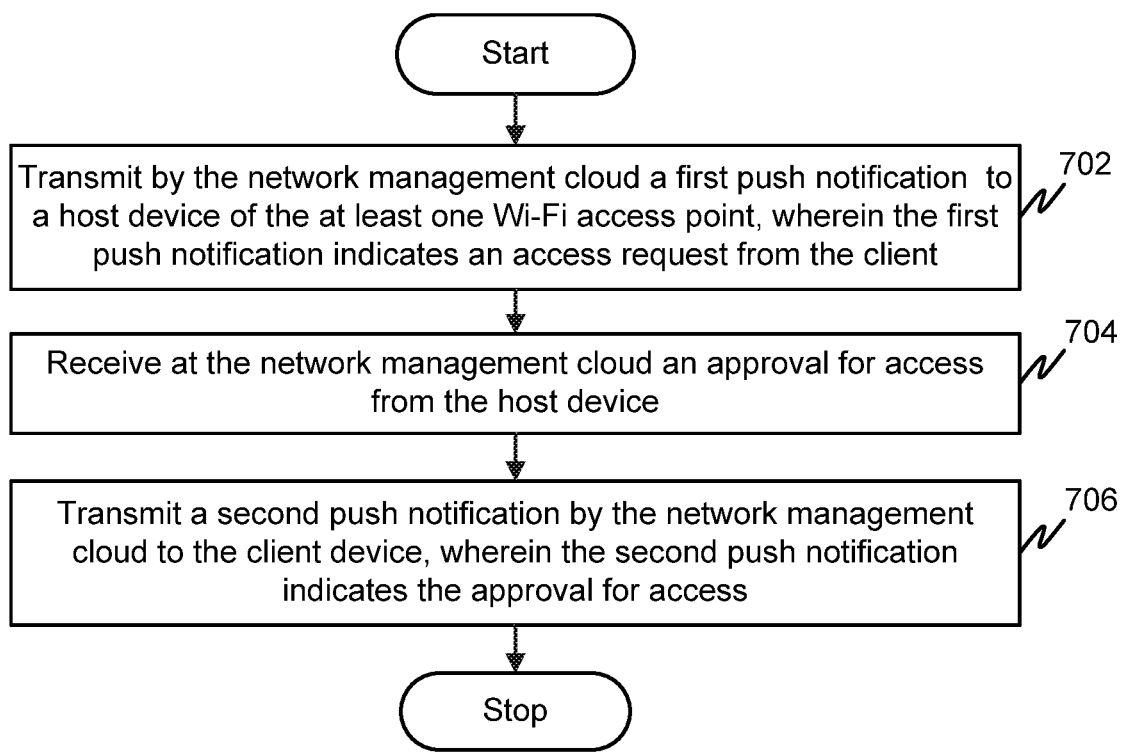
FIG. 7 illustrates a flowchart of a method for allowing a client device to access a Wi-Fi access point through the network management cloud in accordance with an embodiment of the invention.

FIG. 7 illustrates a flowchart of a method for allowing client device 112A to access Wi-Fi access point 102A through network management cloud 104.

At step 702, a first push notification is transmitted by network management cloud 104 to host device 110A of Wi-Fi access point 102A. The first push notification indicates an access request from client device 112A.

At step 704, an approval for access is received at network management cloud 104 from host device 110A. At step 706, a second push notification is transmitted by network management cloud 104 to client device 112A. The second push notification indicates the approval for access.

Figure 8:
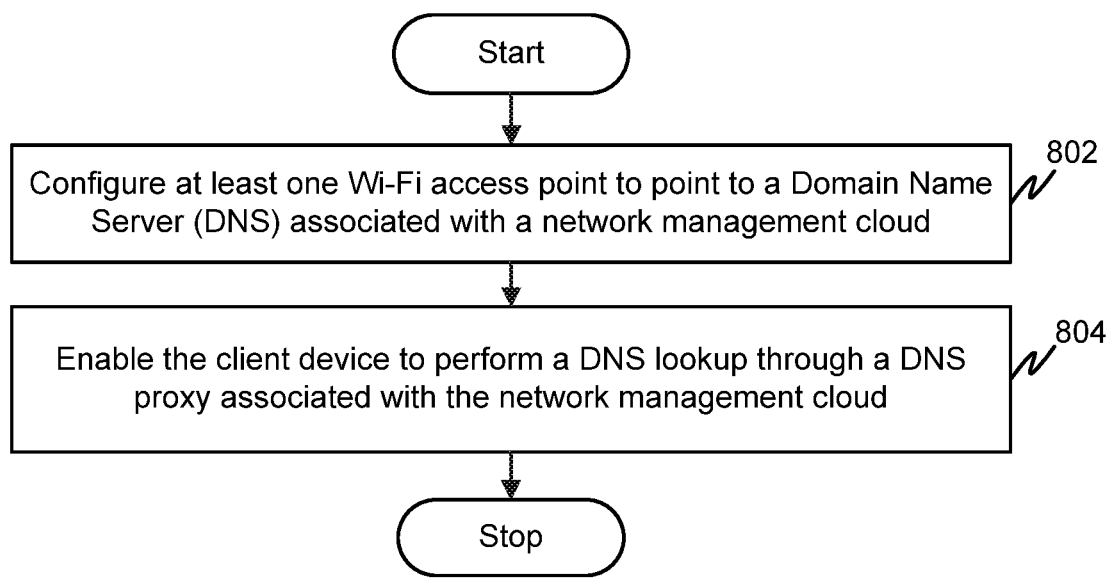
FIG. 8 illustrates a flowchart of a method for handling dynamic IP address changes of a router associated with a Wi-Fi access point in accordance with an embodiment of the invention.

FIG. 8 illustrates a flowchart of a method for handling dynamic IP address changes of a router in accordance with an embodiment of the invention.

At step 802, Wi-Fi access point 102A is configured to point to a DNS associated with network management cloud 104.

Thereafter at step 804, client device 112A is enabled to perform a DNS lookup through a DNS proxy associated with network management cloud 104.

Figure 9:
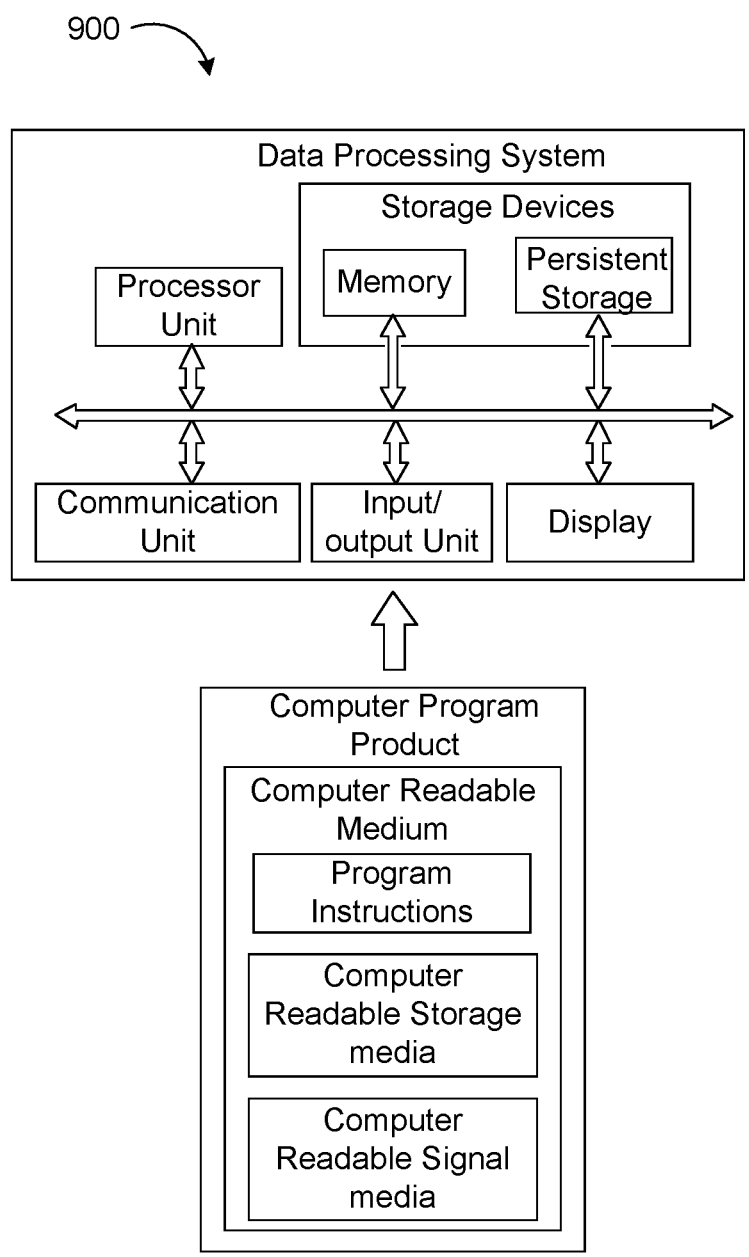
FIG. 9 illustrates a computer program product for automatically managing a plurality of Wi-Fi access points using the network management cloud in accordance with an embodiment of the invention.

FIG. 9 illustrates a computer program product for automatically managing plurality of Wi-Fi access points 102A-102N using network management cloud 104 in accordance with an embodiment of the invention.

An embodiment of the present invention may relate to computer program product 900 with a non-transitory computer readable medium having program instructions thereon for performing various computer-implemented operations of the method and/or system disclosed herein. The computer readable storage media and program instructions may be those specially designed and constructed for the purposes of the method and/or system disclosed herein, or, they may be of the kind well known and available to those having skill in the computer software arts. Examples of the computer-readable storage media include, but are not limited to, magnetic media, optical media, magneto-optical media and hardware devices that are specially configured to store and execute program instructions. Examples of the program instructions include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The invention automatically manages Wi-Fi access points using a network management cloud that implements real time optimization approaches on network parameters associated with the Wi-Fi access points.

The invention provides a mechanism to connect the Wi-Fi access points to the network management cloud. The network management cloud acts as a centralized Wi-Fi performance intelligence and management platform to track user/client data and performance of the Wi-Fi access points and determines optimal operational settings for the Wi-Fi access points.

The network management cloud enables operators to remotely customize security settings. Thus, the operators are able to change passwords of the Wi-Fi access points remotely. Also, the network management cloud enables the operators to adjust the usage behavior of the Wi-Fi access points. For instance, the operators may enable only specific users to access the Wi-Fi access points instead of providing access to all the users having a password associated with the Wi-Fi access points.

Further, the network management cloud enables operators to manage remote manipulation of data associated with the Wi-Fi access points irrespective of IP addresses and different manufacturer interfaces. Additionally, the invention removes a need for a Wi-Fi password by running an authentication schema through the network management cloud.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for automatically managing a plurality of Wi-Fi access points using a network management cloud, the method comprising:
    establishing a connection between at least one Wi-Fi access point of the plurality of Wi-Fi access points and a client device using the network management cloud, wherein the network management cloud acts as an intermediary between the at least one Wi-Fi access point and the client device, including establishing a connection between the at least one Wi-Fi access point and the network management cloud, establishing a connection between the client device and the network management cloud, and allowing the client device to access the at least one Wi-Fi access point through the network management cloud;
    receiving, at the network management cloud, information from the client device;
    analyzing, at the network management cloud, the received information from the client device;
    determining, at the network management cloud, at least one operation setting for the at least one Wi-Fi access point based on the analyzed information;
    configuring the at least one Wi-Fi access point based on the at least one operation setting using the network management cloud, wherein the at least one Wi-Fi access point is configured by the client device through the network management cloud;
    wherein establishing the connection between the client device and the network management cloud comprises:
    downloading, at the client device, a network management cloud application from an application store;
    providing, at the network management cloud, a new instance associated with the client device using the cloud application;
    transmitting, by the client device, a request for an Address Resolution Protocol (ARP) table to the at least one Wi-Fi access point;
    in response to transmitting the request for the ARP table, receiving, at the client device, the ARP table from the at least one Wi-Fi access point;
    determining, at the client device, a MAC address, using the ARP table received from the at least one Wi-Fi access point;
    transmitting, by the client device, a sign up request to the network management cloud using the MAC address determined at the client device; and
    in response to receiving the sign up request at the network management cloud, enabling the client device to log in to the network management cloud.

2. The method according to claim 1, wherein establishing the connection between the at least one Wi-Fi access point and the network management cloud comprises:
    receiving, at the network management cloud, a set of credentials associated with the at least one Wi-Fi access point;
    changing, at the network management cloud, at least one DNS server pointed to by the at least one Wi-Fi access point; and
    changing, at the network management cloud, a service set identifier (SSID) of the at least one Wi-Fi access point, wherein the SSID is changed to be associated with the network management cloud.

3. The method according to claim 1, wherein downloading the network management cloud application comprises:
    transmitting, by the client device, a connection request to a host device of the at least one Wi-Fi access point; and
    in response to receiving the connection request, transmitting, by the host device, a request for an ARP table to the network management cloud;
    in response to receiving the request for the ARP table transmitted by the host device, transmitting, by the network management cloud, the request for the ARP table to the at least one Wi-Fi access point;
    in response to receiving the request for the ARP table transmitted by the network management cloud, transmitting the ARP table from the at least one Wi-Fi access point to the network management cloud;
    transmitting, by the network management cloud, the ARP table to the host device; and
    in response to receiving the ARP table, requesting, by the host device, the network management cloud to provide internet access to the client device for downloading the network management cloud application.

4. The method according to claim 3 further comprising checking, at the network management cloud, the ARP table to determine whether the client device is to be blacklisted.

5. The method according to claim 1, wherein allowing the client device to access the at least one Wi-Fi access point through the network management cloud comprises:
    transmitting, by the network management cloud, a first push notification to a host device of the at least one Wi-Fi access point, wherein the first push notification indicates an access request from the client device;
    receiving, at the network management cloud, an approval for access from the host device; and
    transmitting, by the network management cloud, a second push notification to the client device, wherein the second push notification indicates the approval for access.

6. The method according to claim 1, wherein an operation setting of the at least one operation setting comprises at least one of an operating channel, an operating frequency band, a service set identifier (SSID), a modulation and coding scheme and a transmission power setting.

7. The method according to claim 1 further comprising:
    performing, at the network management cloud, a periodic collection of user statistics and historical user data from the client device; and
    dynamically optimizing, using the network management cloud, at least one network parameter associated with the at least one Wi-Fi access point based on the user statistics and the historical user data collected from the client device.

8. The method according to claim 7, wherein a network parameter of the at least one network parameter comprises at least one of an interference among geographically proximate Wi-Fi access points and a network topology.

9. The method according to claim 1 further comprising handling dynamic IP address changes of a router associated with the at least one Wi-Fi access point, wherein the handling comprises:

configuring the at least one Wi-Fi access point to point to a Domain Name Server (DNS) associated with the network management cloud; and enabling the client device to perform a DNS lookup through a DNS proxy associated with the network management cloud.

10. A system for automatically managing a plurality of Wi-Fi access points using a network management cloud, the system comprising:

a memory;

a processor communicatively coupled to the memory, wherein the processor is configured to:

establish a connection between at least one Wi-Fi access point of the plurality of Wi-Fi access points and a client device using the network management cloud, wherein the network management cloud acts as an intermediary between the at least one Wi-Fi access point and the client device, including establishing a connection between the at least one Wi-Fi access point and the network management cloud, establishing a connection between the client device and the network management cloud, and allowing the client device to access the at least one Wi-Fi access point through the network management cloud;

receive, at the network management cloud, information from the client device;

analyze, at the network management cloud, the received information from the client device;

determine, at the network management cloud, at least one operation setting for the at least one Wi-Fi access point based on the analyzed information;

configure the at least one Wi-Fi access point based on the at least one operation setting using the network management cloud, wherein the at least one Wi-Fi access point is configured by the client device through the network management cloud;

download, at the client device, a network management cloud application from an application store;

provide, at the network management cloud, a new instance associated with the client device using the network management cloud application;

transmit, by the client device, a request for an Address Resolution Protocol (ARP) table to the at least one Wi-Fi access point;

in response to transmitting the request for the ARP table, receive, at the client device, the ARP table from the at least one Wi-Fi access point;

determine, at the client device, a MAC address, using the ARP table received from the at least one Wi-Fi access point;

transmit, by the client device, a sign up request to the network management cloud using the MAC address determined at the client device; and in response to receiving the sign up request at the network management cloud, enable the client device to log in to the network management cloud.

11. The system according to claim 10, wherein the processor is configured to:

receive, at the network management cloud, a set of credentials associated with the at least one Wi-Fi access point;

change, at the network management cloud, at least one DNS server pointed to by the at least one Wi-Fi access point; and change, at the network management cloud, a service set identifier (SSID) of the at least one Wi-Fi access point network, wherein the SSID is changed to be associated with the network management cloud.

12. The system according to claim 10, wherein the processor is further configured to:

transmit, by the client device, a connection request to a host device of the at least one Wi-Fi access point;

in response to receiving the connection request, transmit, by the host device, a request for an ARP table to the network management cloud;

in response to receiving the request for the ARP table transmitted by the host device, transmit, by the network management cloud, the request for the ARP table to the at least one Wi-F access point;

in response to receiving the request for the ARP table transmitted by the network management cloud, transmit the ARP table from the at least one Wi-Fi access point to the network management cloud;

transmit, by the network management cloud, the ARP table to the host device; and in response to receiving the ARP table, request, by the host device, the network management cloud to provide internet access to the client device for downloading the network management cloud application.

13. The system according to claim 10, wherein the processor is further configured to:

transmit, by the network management cloud, a first push notification to a host device of the at least one Wi-Fi access point, wherein the first push notification indicates an access request from the client device;

receive, at the network management cloud, an approval for access from the host device; and transmit, by the network management cloud, a second push notification to the client device, wherein the second push notification indicates the approval for access.

14. The system according to claim 10, wherein the processor is further configured to:

perform, at the network management cloud, a periodic collection of user statistics and historical user data from the client device; and dynamically optimize, using the network management cloud, at least one network parameter associated with the at least one Wi-Fi access point based on the user statistics and the historical user data collected from the client device.

15. The system according to claim 10, wherein the processor is further configured to:

configure the at least one Wi-Fi access point to point to a Domain Name Server (DNS) associated with the network management cloud; and enable the client device to perform a DNS lookup through a DNS proxy associated with the network management cloud.

* * * * *